US012400807B2

(12) United States Patent
Devarde et al.

(10) Patent No.: US 12,400,807 B2
(45) Date of Patent: Aug. 26, 2025

(54) SWITCHING ASSEMBLY WITH MECHANICAL ADVANTAGE DEVICE

(71) Applicant: Eaton Intelligent Power Limited, Dublin (IE)

(72) Inventors: Somnath Janaba Devarde, Maharashtra (IN); Arthur Jur, Cleveland, TN (US); Joe Denton Pardue, Cleveland, TN (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 594 days.

(21) Appl. No.: 17/675,579

(22) Filed: Feb. 18, 2022

(65) Prior Publication Data

US 2023/0268139 A1 Aug. 24, 2023

(51) Int. Cl.

| | |
|---|---|
| ***H01H 3/06*** | (2006.01) |
| ***H01H 3/34*** | (2006.01) |
| ***H01H 3/38*** | (2006.01) |
| ***H01H 3/54*** | (2006.01) |

(52) U.S. Cl.

CPC ................ *H01H 3/06* (2013.01); *H01H 3/34* (2013.01); *H01H 3/38* (2013.01); *H01H 3/54* (2013.01)

(58) Field of Classification Search

CPC .. H01H 3/3021; H01H 3/3005; H01H 3/3015; H01H 2003/3057; H01H 2003/3068; H01H 2003/3073; H01H 2003/3089; H01H 3/30; H01H 3/3031; H01H 3/42; H01H 3/60

See application file for complete search history.

(56) References Cited

U.S. PATENT DOCUMENTS 6,160,234 A * 12/2000 Wehrli, III ........... H01H 3/3021 200/400

2016/0372280 A1* 12/2016 Zhou ...................... H01H 21/24

* cited by examiner

*Primary Examiner* — Ahmed M Saeed

(74) *Attorney, Agent, or Firm* — Stinson LLP

(57) ABSTRACT

A high current switching device includes an electrical switch assembly and an input shaft operatively connected to the electrical switch assembly. An actuator assembly is attached to the input shaft and is configured to move the input shaft to operate the electrical switch assembly. The actuator assembly includes a mechanical advantage device operatively attached to the input shaft. An actuator is coupled to the mechanical advantage device such that movement of the actuator causes movement of the input shaft to operate the electrical switch assembly. The mechanical advantage device is configured to decrease an amount of force required to move the input shaft by the actuator.

17 Claims, 20 Drawing Sheets

SWITCHING ASSEMBLY WITH MECHANICAL ADVANTAGE DEVICE

FIELD OF THE DISCLOSURE

The present disclosure generally relates to a switching apparatus, and more particularly to a switching apparatus having an actuator assembly including a mechanical advantage device reducing a force required to move the actuator.

BACKGROUND

Electrical switches are often used to act as a main disconnect for commercial and industrial applications. The switch has to make and break the current at the contacts safely to ensure electrical connection and disconnection of the circuit. Because the switches are to make and break on load, an operating mechanism is incorporated before the contacts so as to first store the energy inside the mechanism by means of a spring-linkage system, and to then let the mechanism release the stored energy to the contacts to make or break the current at some pre-determined velocity.

Traditionally, an external handle is connected to the mechanism shaft and the energy to the mechanism is supplied manually by human effort. Due to the requirements of higher energy needed to operate the mechanism, the typical handle force required to activate the switch exceeds 40 pounds of force (lbf), which is generally considered the maximum force a human can comfortably exert. Typically, the handle force requirement is at or around 90 lbf. The present disclosure seeks to employ a mechanism to lower the input force requirement.

SUMMARY

One aspect of the present disclosure is a high current switching device comprising an electrical switching assembly, an input shaft operatively connected to the electrical switching assembly, and an actuator assembly attached to the input shaft and configured to move the input shaft to operate the electrical switching assembly, the actuator assembly comprising a mechanical advantage device operatively attached to the input shaft and an actuator coupled to the mechanical advantage device, such that movement of the actuator causes movement of the input shaft to operate the electrical switching assembly, wherein the mechanical advantage device is configured to decrease an amount of force required to move the input shaft by the actuator.

Another aspect of the present disclosure is directed to a high current switching device comprising an electrical switching assembly, an input shaft operatively connected to the electrical switching assembly, and an actuator assembly attached to the input shaft and configured to move the input shaft to operate the electrical switching assembly, the actuator assembly comprising a ratchet assembly operatively attached to the input shaft and an actuator coupled to the ratchet assembly, such that movement of the actuator causes movement of the input shaft to operate the electrical switching assembly, wherein the ratchet assembly is configured to allow motion of the actuator in a first direction to move the input shaft in the first direction while preventing motion of the input shaft in a second direction opposite the first direction when the actuator is moved in the second direction.

A further aspect of the present disclosure is a mechanical advantage assembly configured to couple an actuator to a switching device, the mechanical advantage device assembly comprising a mechanical advantage device configured to be operatively coupled to the input shaft and a hub configured to secure the mechanical advantage device to the input shaft, wherein the mechanical advantage device is configured to decrease an amount of force required to move the input shaft by the actuator.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
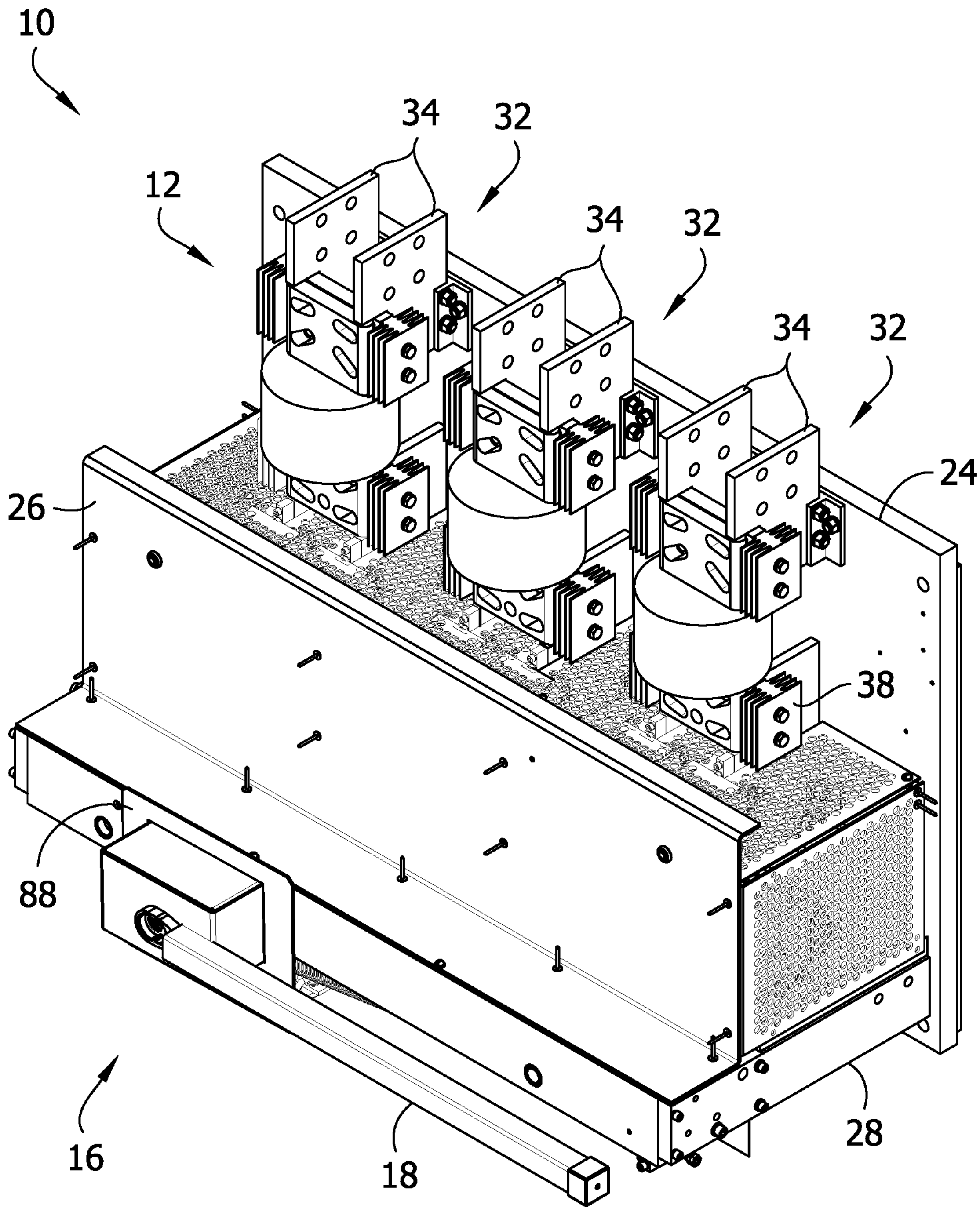
FIG. 1 is a perspective view of a high current switching device including an electrical switch assembly and an actuator assembly for shifting the switch assembly between open and closed conditions.
Figure 2:
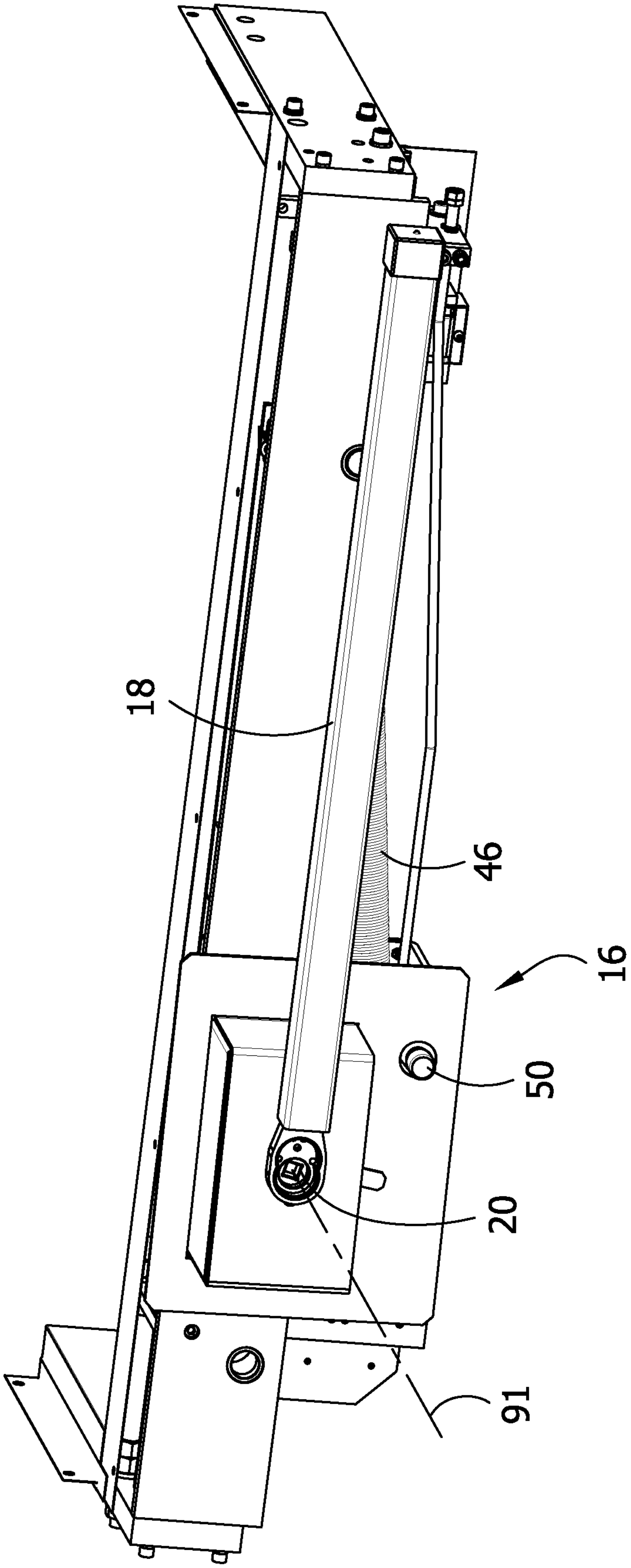
FIG. 2 is a fragmentary perspective view of the high current switch device in FIG. 1 showing the actuator assembly.
Figure 3:
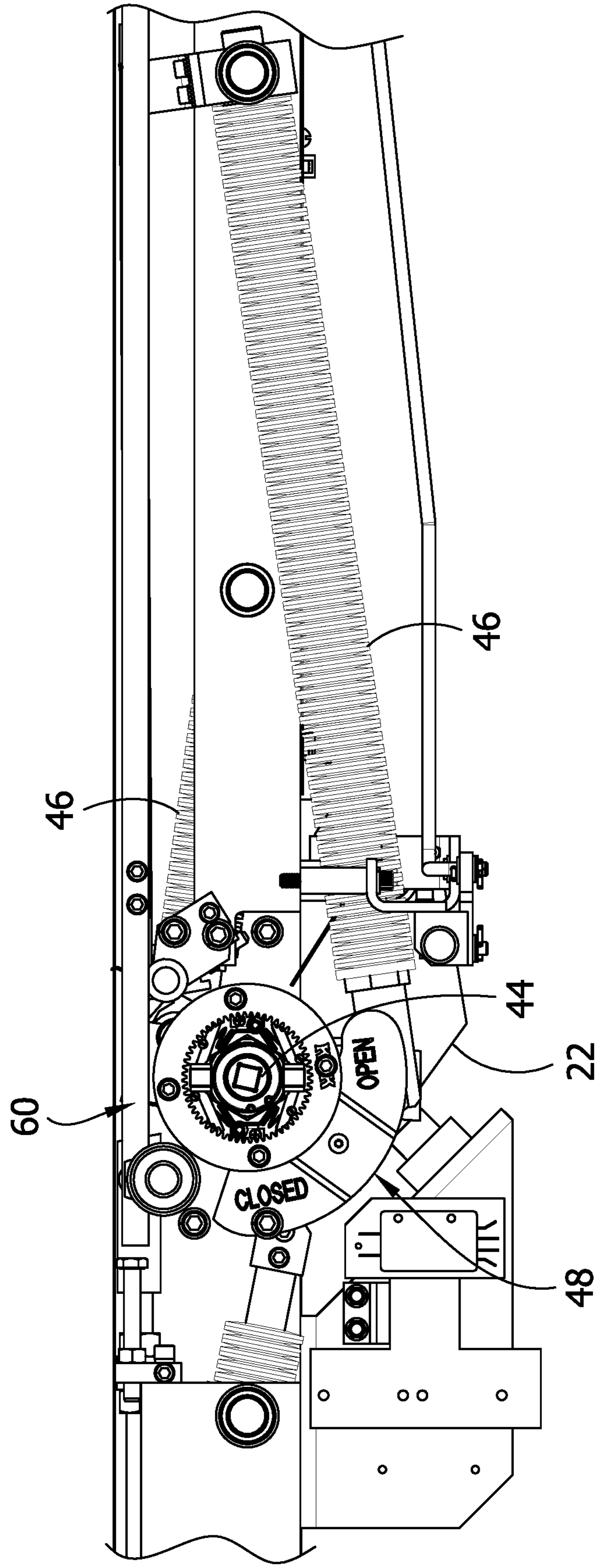
FIG. 3 is a fragmentary perspective view of the high current switch device in FIG. 1 showing a mechanical advantage device, selector assembly, and a ratchet assembly of the actuator assembly.

Referring to FIGS. 1-13, the present disclosure is generally directed to an apparatus 10 including an electrical switch assembly 12. In the illustrated embodiment, the apparatus 10 is a high current switching device. An actuator assembly 16 is operatively connected to the switch assembly 12. The actuator assembly 16 generally includes a manually operable actuator (e.g., handle) 18 for shifting the switch assembly 12 between an open and closed position. The apparatus 10 is generally sized and shaped for installation in a switchboard which generally includes a cubicle for containing a switch assembly. In this way, the switch assembly is typically supported on a base panel 24 sized and shaped to correlate with the size and shape of the intended cubicle. A front panel 26 is mounted to the front of the switch assembly 12.

This particular example of a switch assembly shown in the illustrated embodiment is known as a bolted pressure switch assembly. The switch assembly includes three sets of electrical contacts 32. Each set includes an upper stationary contact 34, a movable contact (not shown), and an intermediate stationary contact 38. Lower stationary contacts (not shown) can also be included. The movable contacts are supported to pivot from open positions to closed positions in electrical contact with both the upper and intermediate stationary contacts 34, 38. This shifts the switch assembly 12 from the open position to the closed position. Fuses (not shown) would be installed to complete electrical current paths from the intermediate stationary contacts 38 to corresponding lower stationary contacts.

An actuator linkage 22 is mounted to and disposed in the apparatus 10 and operatively connects the actuator assembly 16 to the switch assembly 12. The actuator linkage 22 includes an actuator shaft (input shaft) 42 and a pair of springs 46. The shaft 42 is supported for rotation about an axis a1 by the actuator assembly 16. Operation of actuator assembly 16 to rotate the shaft 42 stores and releases energy in the springs 46. In particular, the shaft 42 is manually rotated by use of a handle 18 from a first position to a second position. When the shaft 42 is rotating toward the second position, the actuator motion first compresses one of the springs 46. Once the spring 46 is compressed, the compressed spring 46 is placed into a stressed position. This operation charges the opening spring 46. Next, the shaft 42 is rotated back to its first position by operation of the actuator 16, while keeping the compressed spring latched. During this process, the other of the two springs 46 is compressed to a stressed position (not a compressed position). The other spring 46 is released to snap back from the compressed position, which drives the device to shift the switch assembly 12 from the open to the closed position under the bias of the released spring. Therefore, this motion charges the closing spring 46 and closes the switch. The actuator assembly 16 can also include a release button 50 for releasing the second latch spring 46, thereby shifting the switch assembly 12 back to the open position. In various embodiments, the switch assembly 12 can include open and closed indicia 48 to indicate to a user which position the switch assembly is in.

Figure 12:
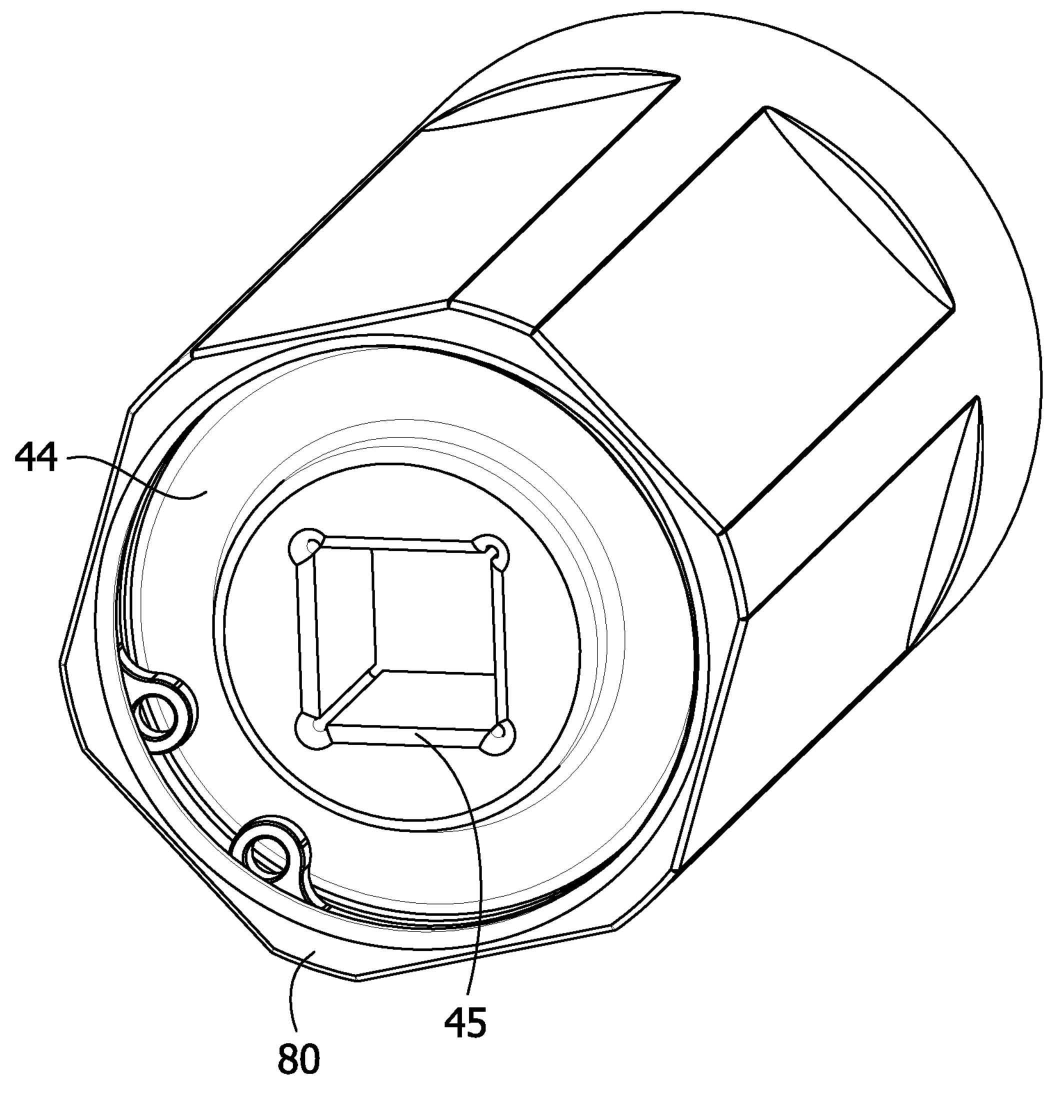
FIG. 12 is a perspective view of the mechanical advantage device and sleeve.

Referring to FIGS. 3-11, the actuator assembly 16 generally comprises a mechanical advantage device 44 operatively attached to the input shaft 42. The mechanical advantage device 44 comprises a first end configured for attachment to the input shaft 42, and a second end configured for attachment to the actuator 18. In one embodiment, the first end of the mechanical advantage device 44 is received around the input shaft 42, and the second end includes a recess 45 configured to receive a post (not shown) of the actuator 18 to couple the actuator to the mechanical advantage device. It will be understood that the mechanical advantage device 44 could be coupled to the actuator 18 by other means without departing from the scope of the disclosure. The mechanical advantage device 44 can include, for example, a force multiplier, or, more particularly, a torque multiplier (FIG. 12). In use, the force multiplier is configured to decrease an amount of force required to move the input shaft 42 by the handle 18, for example, to less than 40 lbf, or less than about 30 lbf. In various embodiments, the required force can be from about 10 lbf to about 80 lbf, from about 10 lbf to about 60 lbf, or from about 10 lbf to about 40 lbf. In particular, the torque ratio of the torque multiplier can be at least about 3:1, for example, about 3.4:1, or from about 3:1 to about 4:1. The torque multiplier also preferably provides at least 200 ft./lbs. of force, for example at least 250, or at least 300 ft./lbs. of force. In one embodiment the torque multiplier may be the Klutch Torque Multiplier (e.g., Mini Torque Multiplier) sold by Northern Tool+Equipment, a company based out of Burnsville, MN.

In typical switching devices having increased force input requirements, the handle is only turned about 90° from its starting position in order to provide ease of use. However, in various embodiments, by reducing the force input requirement as a result of the addition of the mechanical advantage device 44, the handle 18 may require more than 90° of rotation, for example, more than 180°, more than 270°, more than 360°, or more than 450° of rotation to sufficiently operate the apparatus 10 to complete the opening and closing of the switch. In some embodiments, the actuator assembly 16 includes a ratchet assembly 60. The ratchet assembly 60 is particularly useful in situations where the user wants to or needs to limit handle rotation, such as to about 90° of rotation, while the force multiplier 44 requires more than 90° of rotation. In this way and as will be explained in greater detail below, with the ratchet assembly 60, the handle 18 can be rotated to the maximum desired rotational degree for rotating the input shaft 42 during operation of the apparatus 10 to open and close the switching assembly 12.

Referring in particular to FIGS. 4-10, the actuator assembly 16 further includes a hub 52 mounted on the input shaft 42. The hub 52 defines an opening 54 (e.g., a hex hole) in a central portion thereof through which the input shaft 42 and, when in use, the mechanical advantage device 44, is inserted. The hub 52 includes a back mounting portion 56 and a front cover 58. The ratchet assembly 60 is sandwiched between the mounting portion 56 and cover 58. The ratchet assembly 60 includes a ratchet ring 62 having an internal gear 64. The internal gear 64 is generally circular in shape with a central opening 66. Thus, the internal gear 64 contains an inner peripheral portion and an outer peripheral portion. A plurality of teeth 70 are radially disposed on the inner peripheral portion. The ratchet ring 62 is coupled to the hub 52 via fasteners 72. The hub 52 itself can be coupled to the apparatus 10 by use of the fasteners 72.

Figure 4:
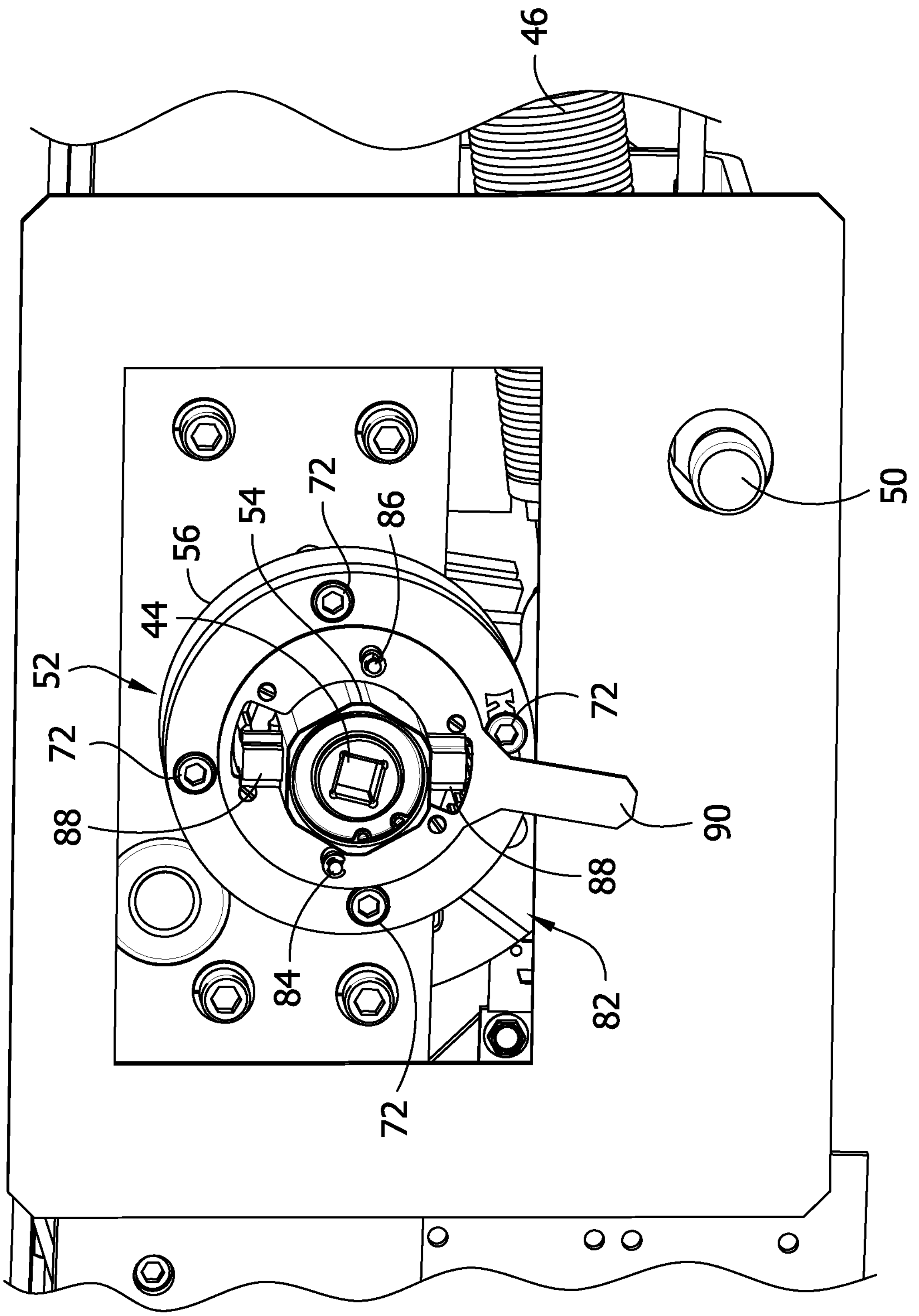
FIG. 4 is a fragmentary perspective view of the mechanical advantage device, selector assembly, and ratchet assembly.
Figure 5:
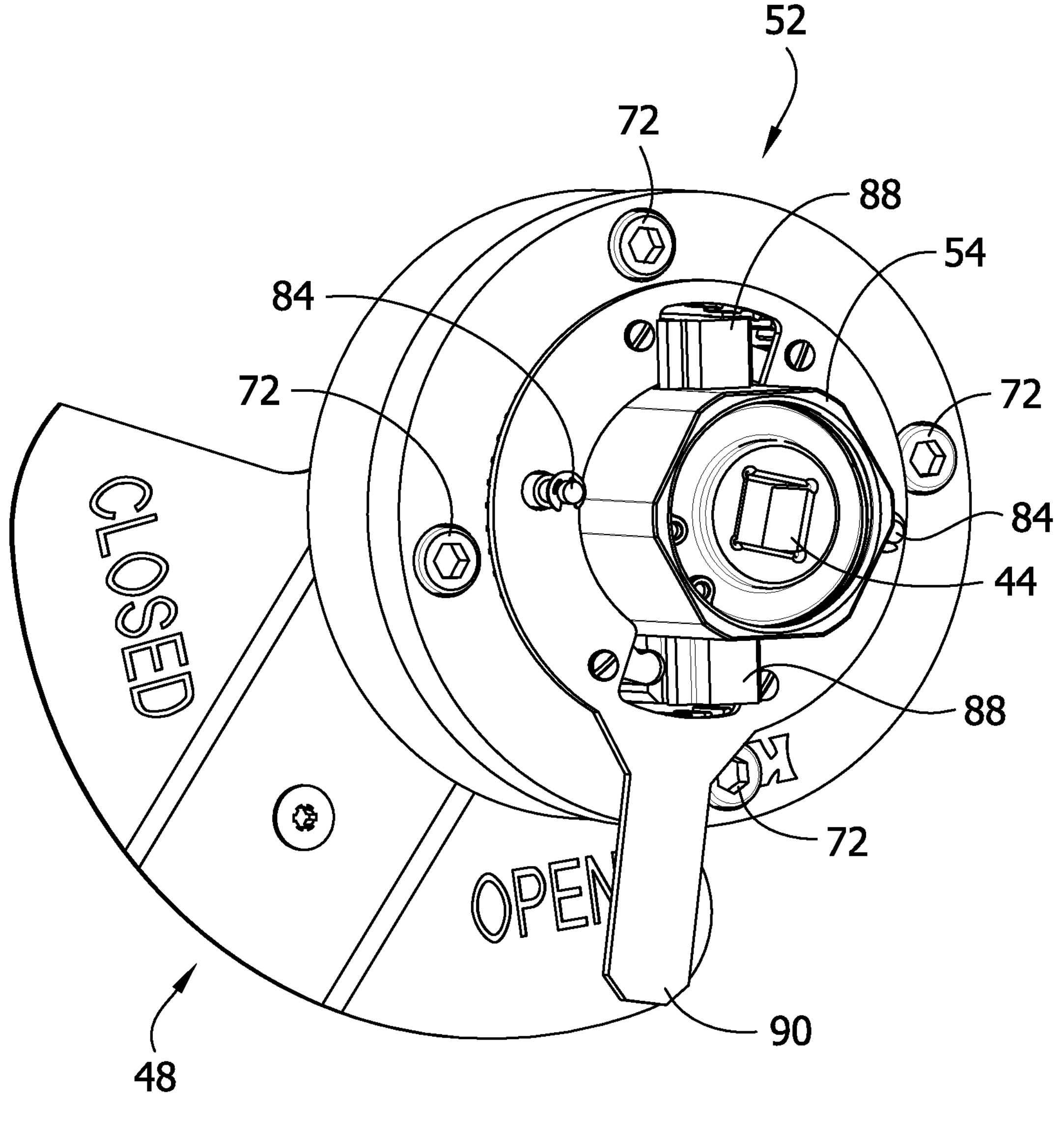
FIG. 5 is a perspective view of the mechanical advantage device, selector assembly, and ratchet assembly
Figure 6:
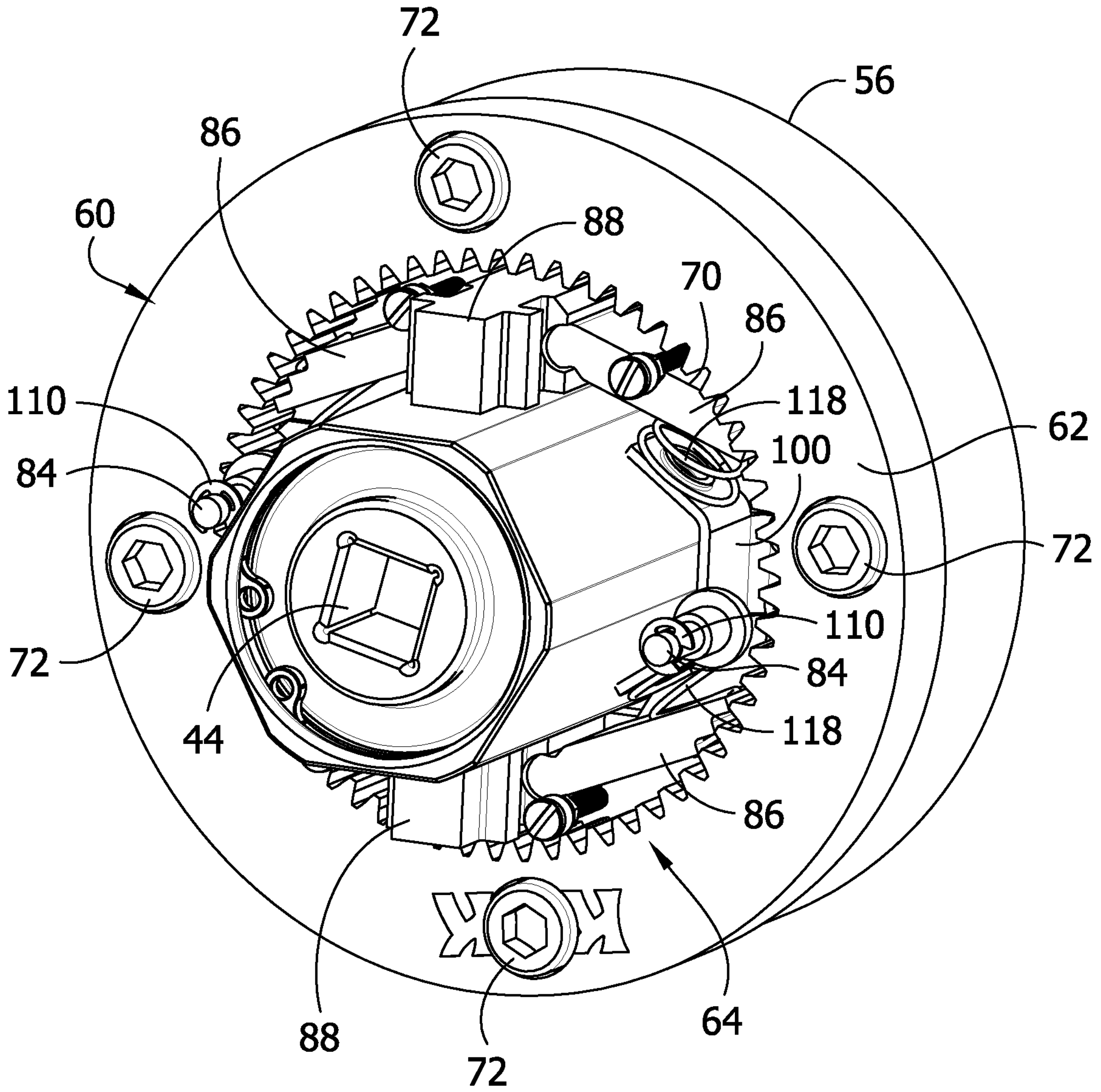
FIG. 6 is a perspective view of the mechanical advantage device, selector assembly, and ratchet assembly in FIG. 4 with a selector plate removed.
Figure 7:
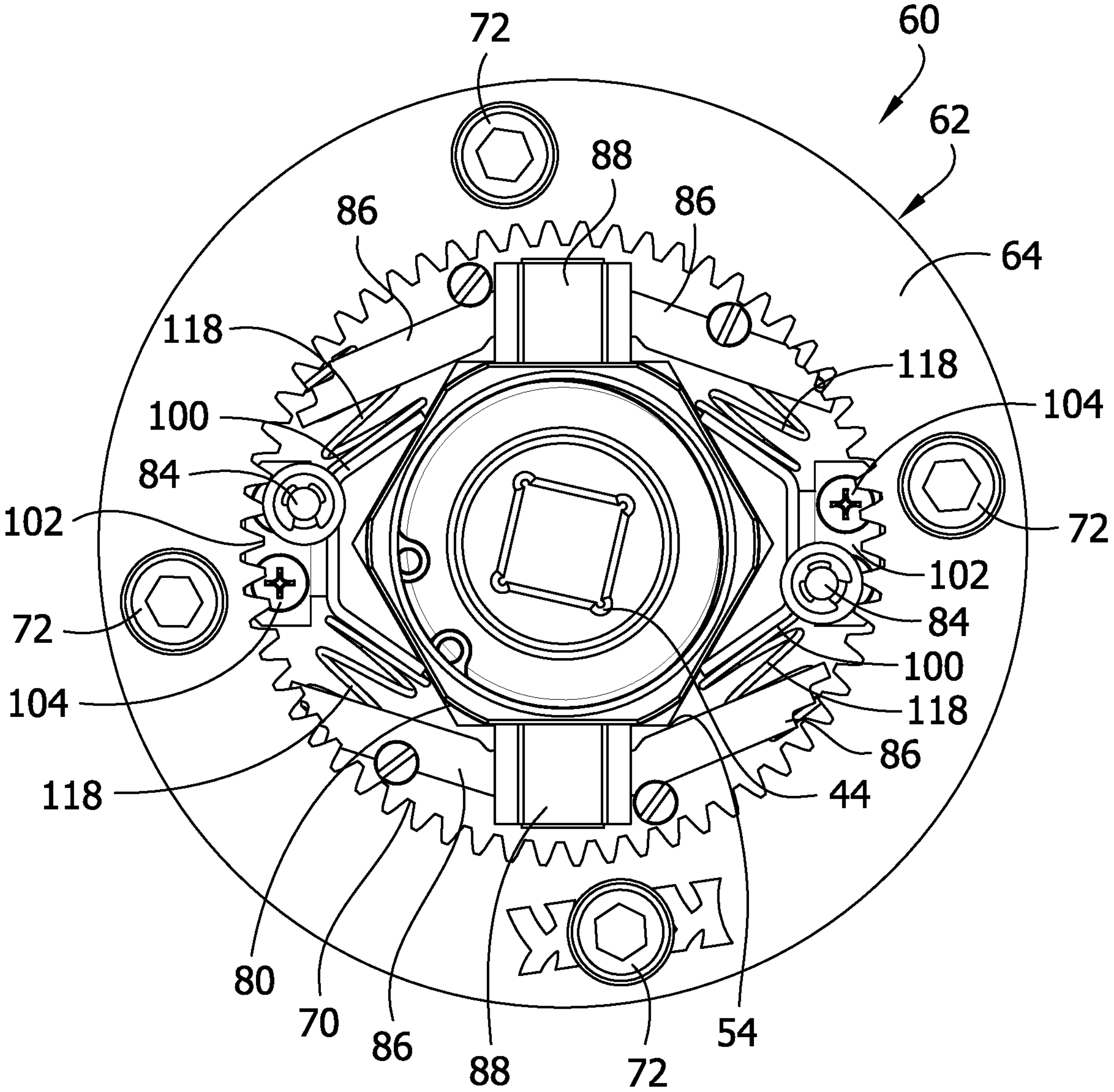
FIG. 7 is a front view of the mechanical advantage device, selector assembly, and ratchet assembly in FIG. 6.
Figure 8:
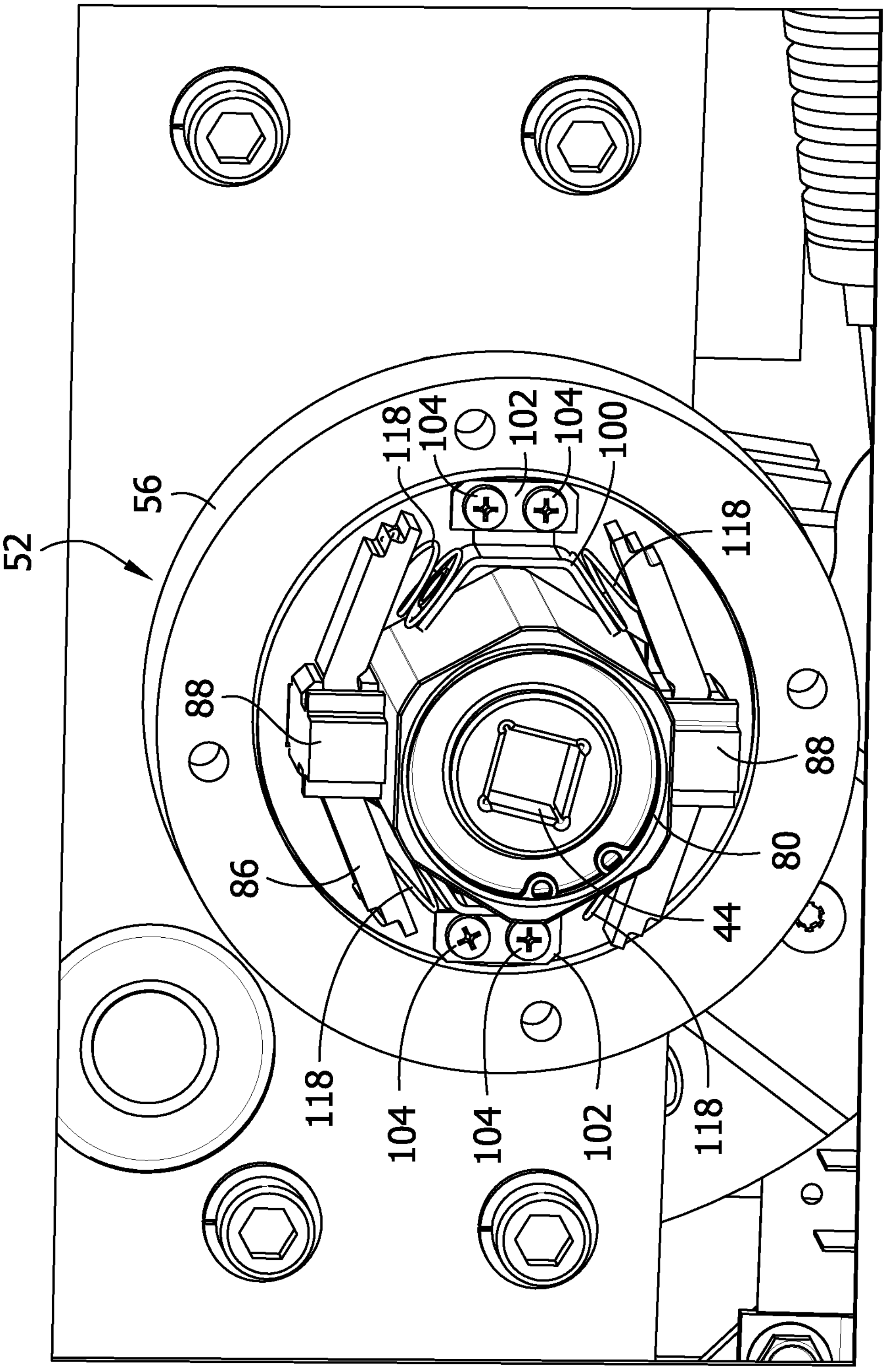
FIG. 8 is the fragmentary perspective view of the high current switch device in FIG. 3 with the selector plate and a ratchet ring removed.
Figure 9:
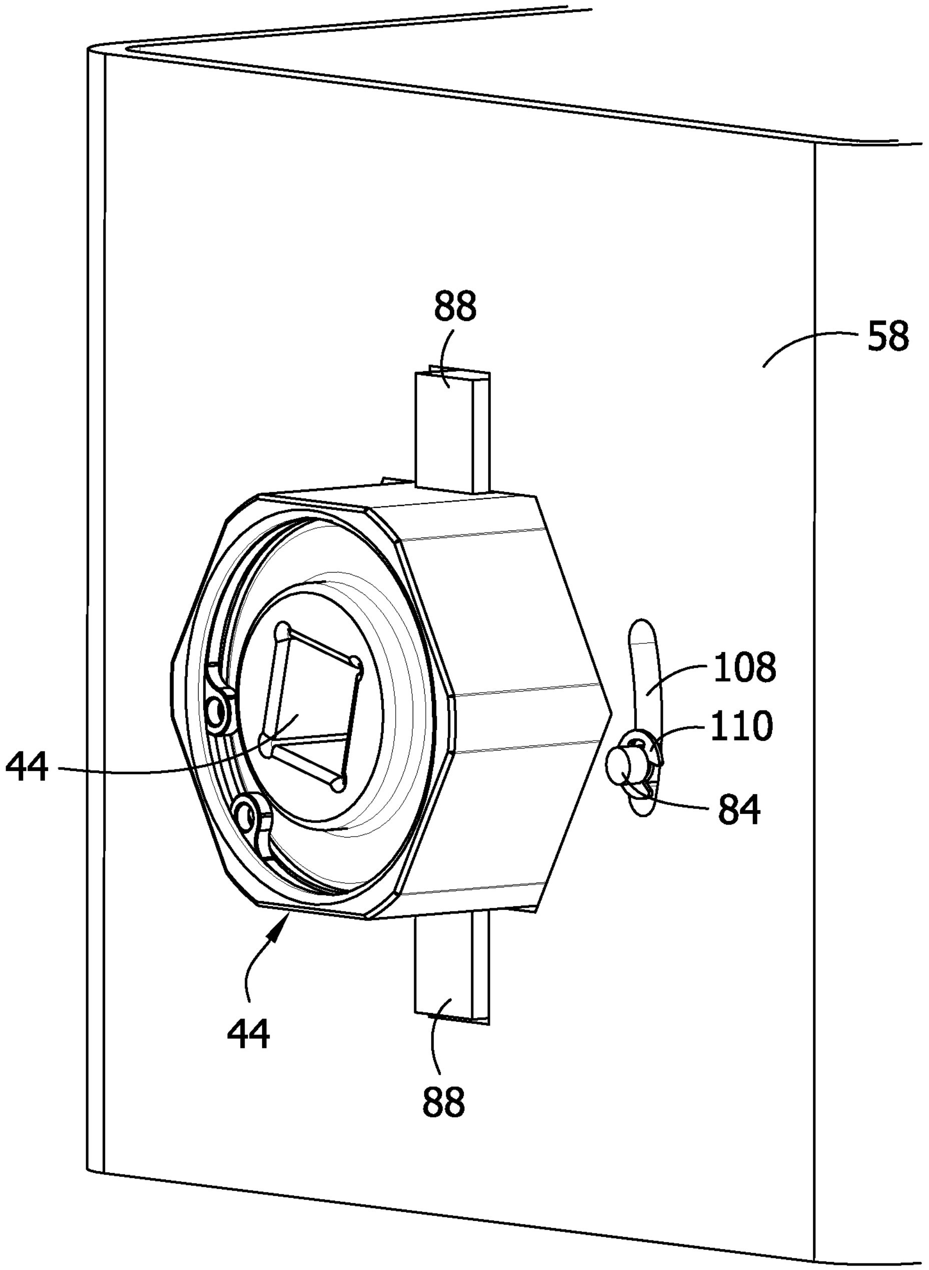
FIG. 9 is the fragmentary perspective view of the selector assembly and mechanical advantage device with the front cover in place.
Figure 10:
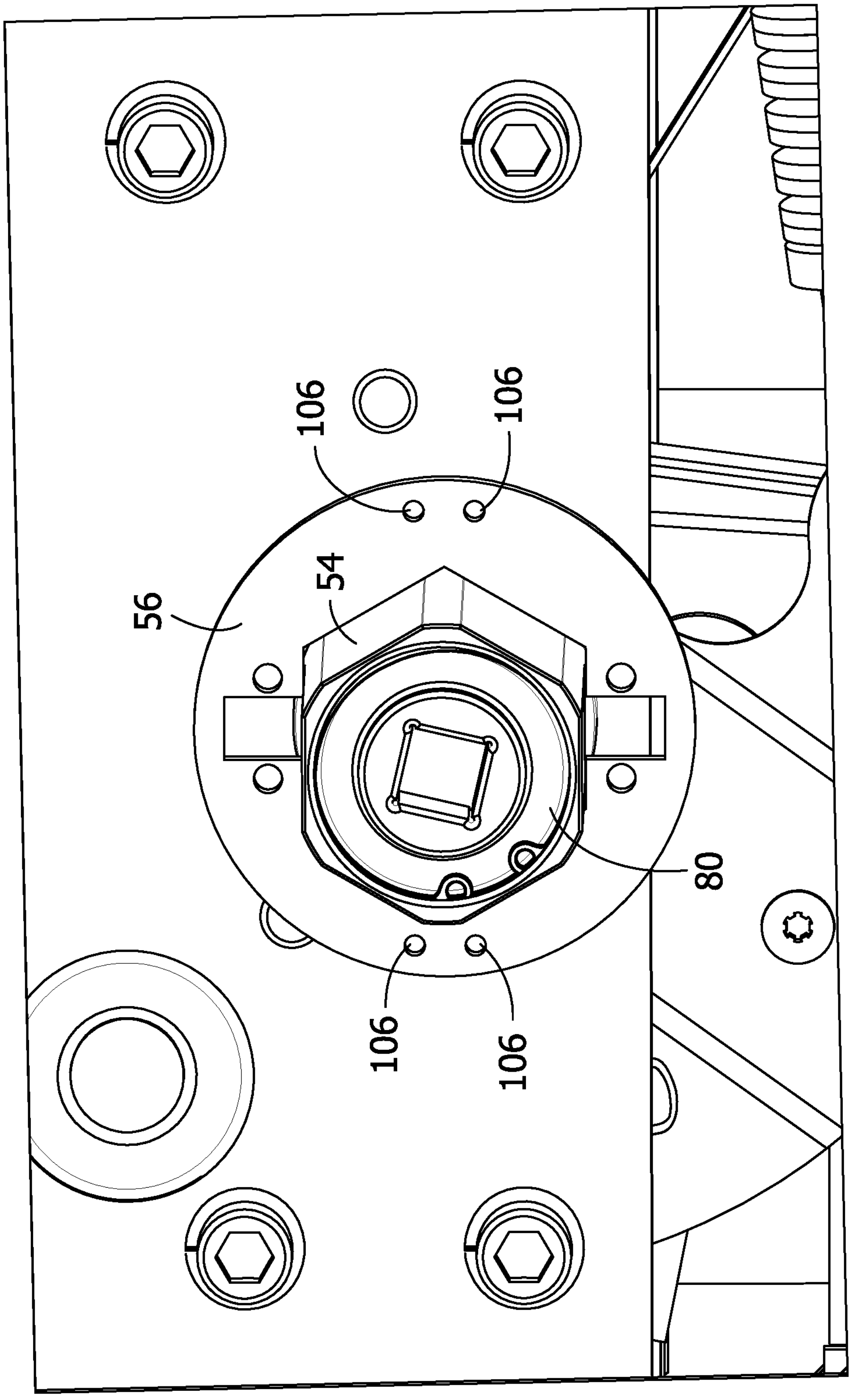
FIG. 10 is the fragmentary perspective view of the high current switch device in FIG. 8 with the entire ratchet assembly removed showing a mount plate of the selector assembly.
Figure 11:
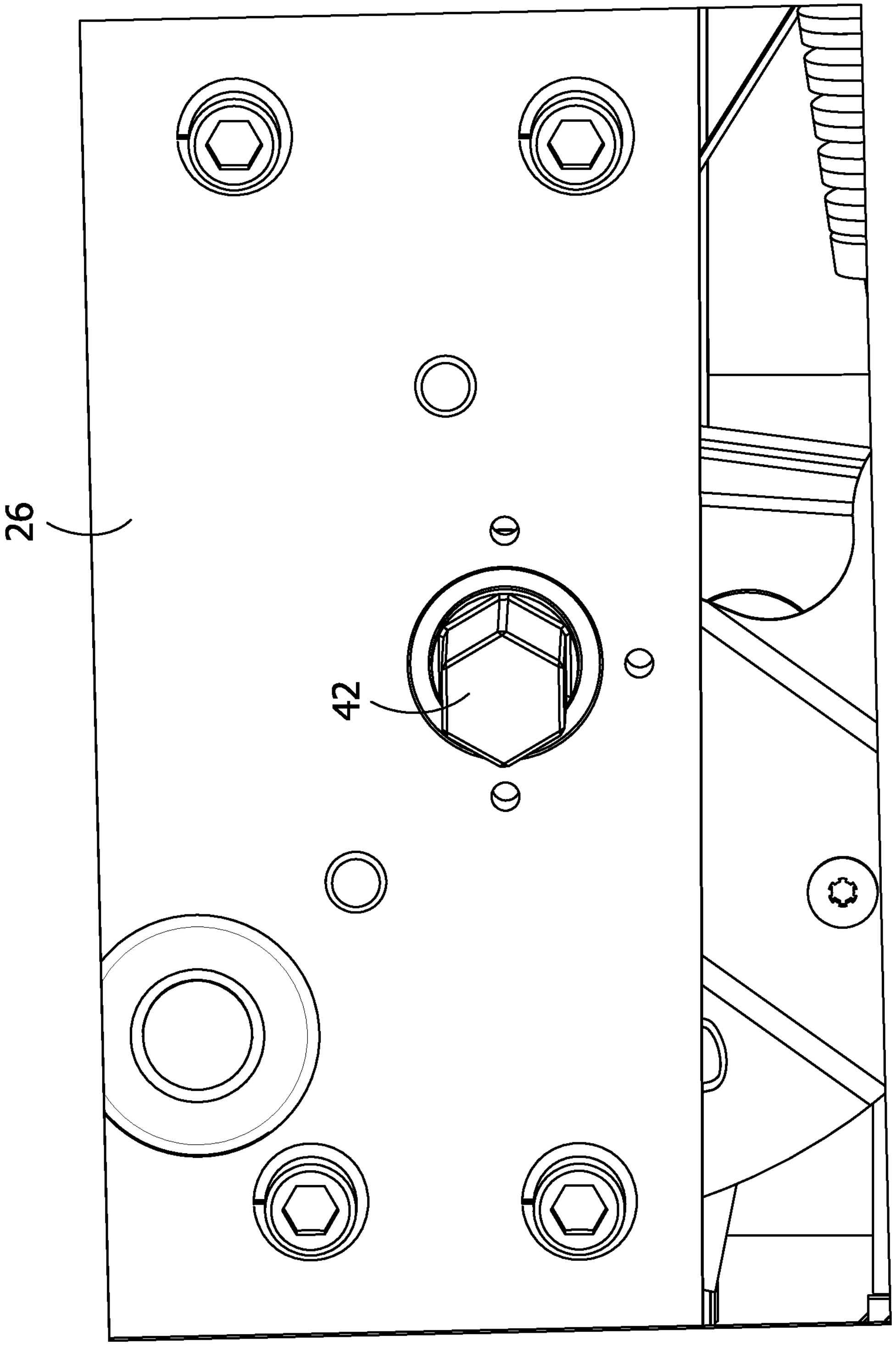
FIG. 11 is the fragmentary perspective view of the high current switch device in FIG. 10 with the mount plate and mechanical advantage device removed showing an input shaft of the switch device.
Figure 13:
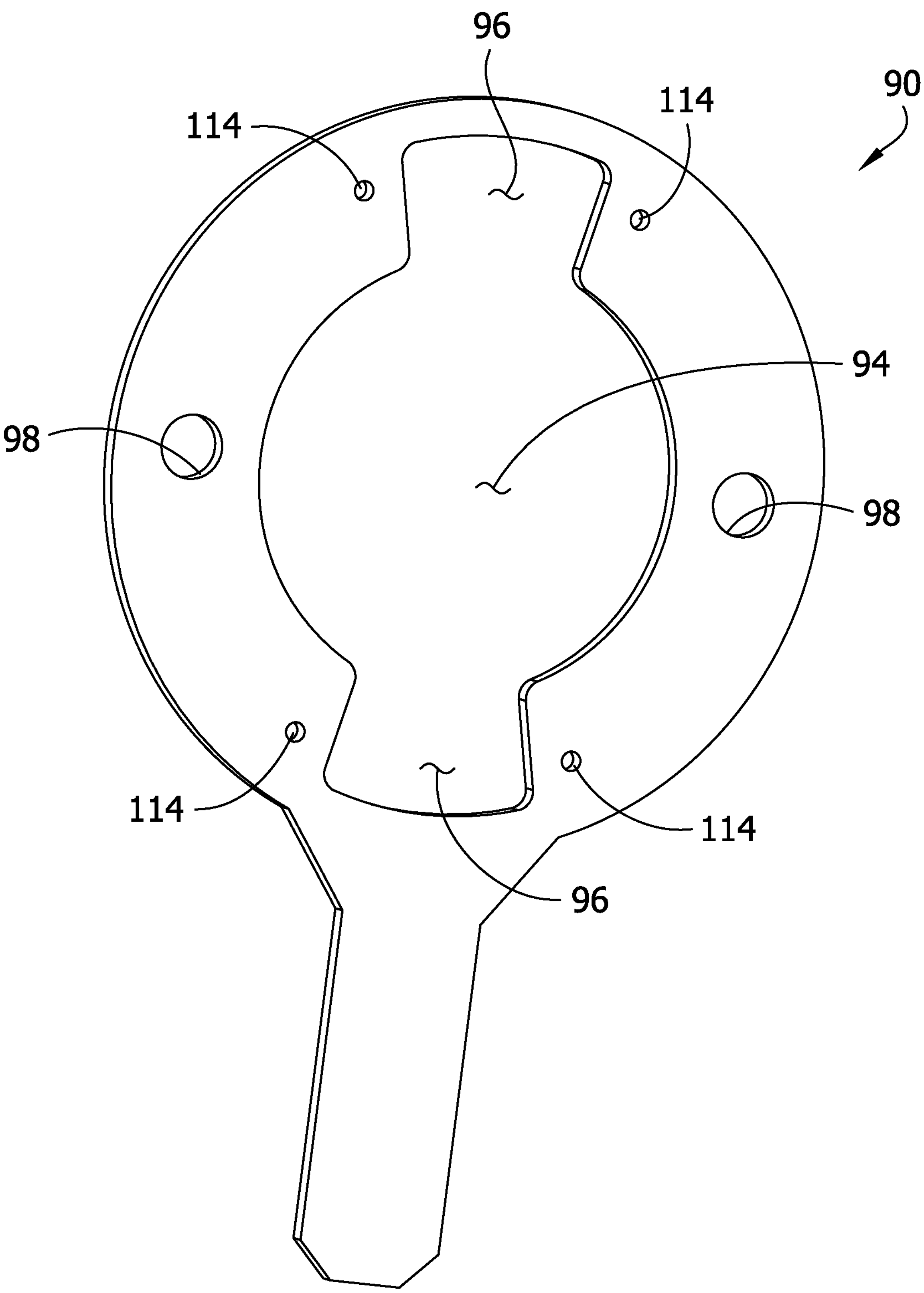
FIG. 13 is a perspective view of the selector plate.

Referring to FIGS. 4-6, a selector assembly 82 comprises a sleeve 80, at least one selector 84, a plurality of pawls 86, at least one stop 88, and optionally, a selector plate 90. In various embodiments, the at least one stop 88 can be integrally formed with the sleeve 80. In the illustrated embodiment, the selector assembly 82 comprises two stops 84, one disposed at the top of the sleeve 80 and the other disposed at the bottom of the sleeve 80. The stops 84 generally protrude outward from the ratchet assembly 60 toward the front cover 58. In the illustrated embodiment, the central portion of the stop 88 protrudes farther than the side portions. The selector plate 90 includes a central opening 94 that is generally circular to allow passage of the sleeve 80 and mechanical advantage device 44 (FIG. 13). The selector plate central opening 94 also has cut-out portions 96 to allow passage of the stops 88 and limit rotational movement of the plate 90 to a pre-determined amount.

As mentioned above, the selector assembly 82 comprises at least one selector (pin) 84. The illustrated embodiment contains two selectors 84 located on either side of the sleeve 80. In embodiments comprising a selector plate, the selector plate 90 defines pin openings 98 to allow passage of the shaft of the pin 84. The other end of the pin 84 mates with a pin tab 102. The illustrated embodiment contains two pin tabs 102 located on either side of the sleeve 80. The pin tabs 102 are indirectly coupled to at least one of the pawls 86. In the illustrated embodiment, each pin tab 102 is coupled to two pawls 86. Each of the pin tabs 102 contain at least one fastener opening 104 through which a fastener is placed to mate with tab fastener openings 106 defined in the back mounting portion 86. The selectors 84 are also inserted through respective slots 108 (only one is shown) in the front cover 58 sized and shaped to receive the shaft of the pin 84. A split washer 110 is placed between the end of the pin 84 and the front cover 58 to keep the pin from withdrawing. The selector plate 90 also defines a plurality of fastener openings 114 to movably attach the selector plate 90 to the ratchet ring 62.

At least one pawl 86 is coupled to each stop 88. In the illustrated embodiment, two pawls 86 are coupled to each of the two stops 88, each extending from opposite sides of the stop 88 toward the ratchet ring 62. The ratchet assembly 60 also includes a plurality of springs 118, wherein one end of the spring 118 is coupled to a protruding arm 100 attached to a pin tab 102, and an opposite end of the spring engages one of the pawls 86. In the illustrated embodiment, each pin tab 102 attaches a pair of arms 100, each arm having a spring 118 mounted thereon. When deployed, one of the two pawls 86 in a pair of pawls engages the ratchet teeth 70 to permit motion of the internal gear 84 in an operational direction during rotation of the input shaft 42 by the actuator 18, and prohibit movement of the internal gear in a non-operational direction during rotation of the actuator 18 in an opposite direction as is customarily known in the mechanics of a ratchet. The springs 118 provide a biasing force configured to urge the pawls 86 into engagement with the ratchet teeth 70 allowing the pawls and ratchet ring 62 to interact to perform the ratchet function in a first direction.

In the illustrated embodiment, two of the pawls 86 are configured for operative engagement with the ratchet ring 62 at any given time. As shown, the top left and bottom right pawls 86 are engaged with the teeth 70 on the ratchet ring 62, and the top right and bottom left pawls are disengaged from the ratchet ring. The pins 82 function to operatively engage the top right pawl 86 and bottom left pawl to disengage the pawls from the ratchet ring 62. Movement of the selector plate 90, to which the pins 84 are connected, from the illustrated (first) position to a second position causes the pins to operatively engage the top left and bottom right pawls 86 and to disengage the top left and bottom right pawls from the ratchet ring 62. The pins 84 thus remove the spring force exerted on the operatively engaged pawls 86 to disengage those pawls from the ratchet ring 62. It will be understood that when only two pawls 86 are used, one of the two pins 84 will operatively engage one of the pawls to disengage the operatively engaged pawl from the ratchet ring 62 and the other pawl will be free to engage the ratchet ring to perform the necessary ratchet function. Movement of the selector plate 90 will disengage the operatively engaged pin 84 and will operatively engage the other pin with the previously disengaged pawl 86 to configure the ratchet assembly 60 to impart the ratchet function in the opposite direction.

In operation, a user may operate the actuator assembly 16 by cranking (i.e., rotating) the actuator 18 under the influence of the mechanical advantage device 44 to close the switch assembly 12. In particular, with the selector plate 90 is in a first position, the actuator 18 is operated like a handle of a wrench causing rotation of the input shaft 42. The rotation of the actuator 18 is made significantly easier through the mechanical advantage provided by the torque multiplier 44. As previously explained, the ratchet assembly 60 ensures that rotation of the input shaft 42 is only imparted in one direction by crank (i.e., back and forth) rotation of the actuator 18. The initial cranking of the actuator 18 completes the first step of closing the switch assembly 12 by charging the opening spring 26. Then, the user rotates the selector plate 90 to a second position, which changes the pawls 86 that are engaged with the ratchet ring 62, and thus allows a change in direction of rotation of the input shaft 42. The user can then crank the actuator 18 causing operative motion of the input shaft 42 in the opposite direction. This second crank motion is similarly aided by the mechanical advantage device 44. Completion of the second crank motion functions to charge the closing spring 46 and close the switch. As a result, the apparatus 10 can be more easily operated to perform the switch opening and closing function.

The actuator 18 itself can have an internal gear (ratchet) similar to those known in the art. The actuator 18 can also include a lever 20 (FIG. 2) that determines the activating direction of actuation. In general, the intended direction of rotation of both the selector plate 90 and the handle lever 20 should match to facilitate proper operation of the actuator assembly 16. Therefore, in one embodiment, both the handle lever 20 and selector plate 90 must be actuated to cause the desired rotation of the input shaft 42.

The present disclosure also relates to a mechanical advantage assembly configured to couple an actuator 18 to a switching device 12. In general, the assembly can comprise the mechanical advantage device 44 described above configured to be operatively coupled to the input shaft 42. The assembly further comprises the hub 52 described above.

Figure 18:
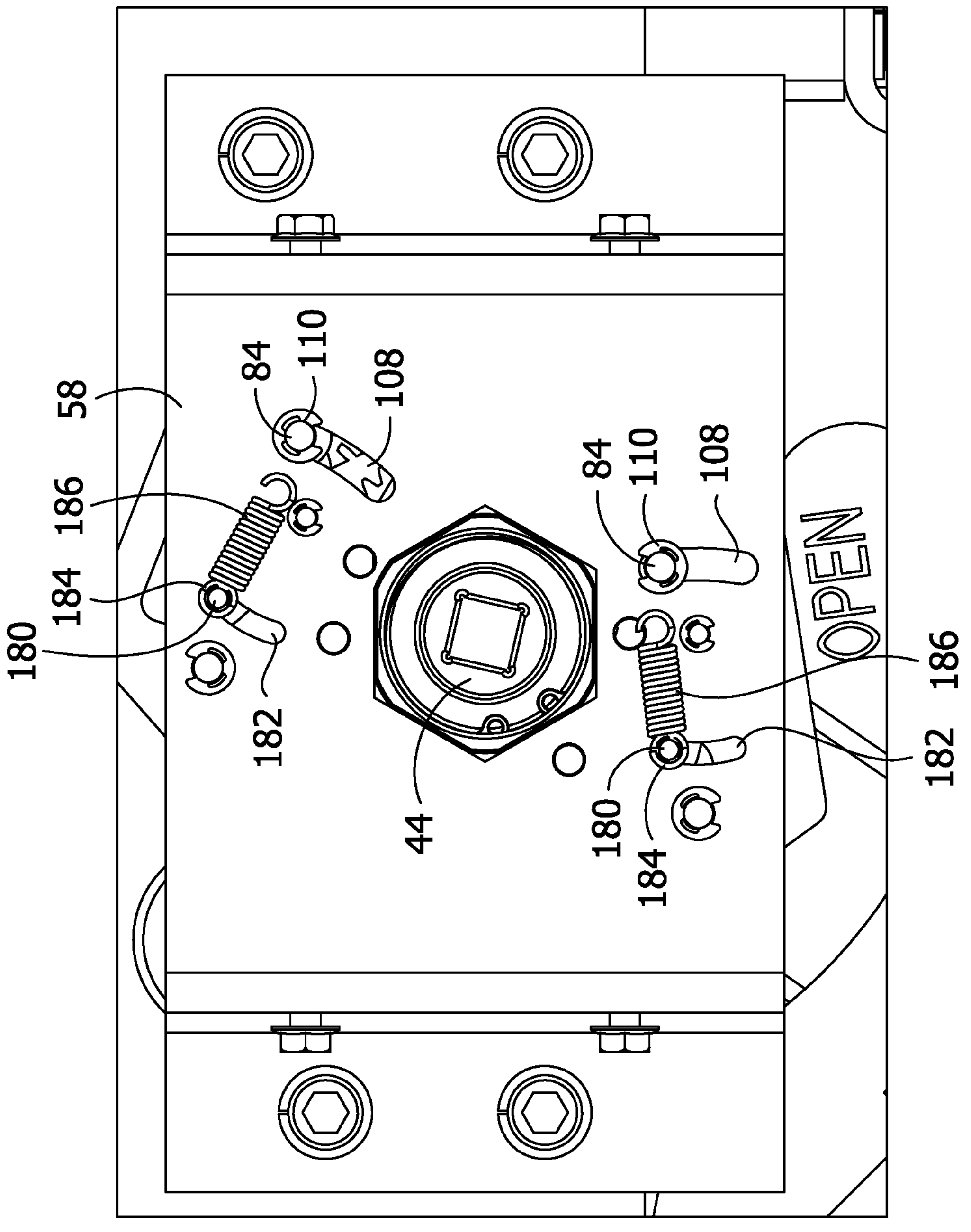
FIG. 18 is a fragmentary front plan view of another embodiment of a selector assembly without a selector plate and mechanical advantage device with the front cover in place.
Figure 19:
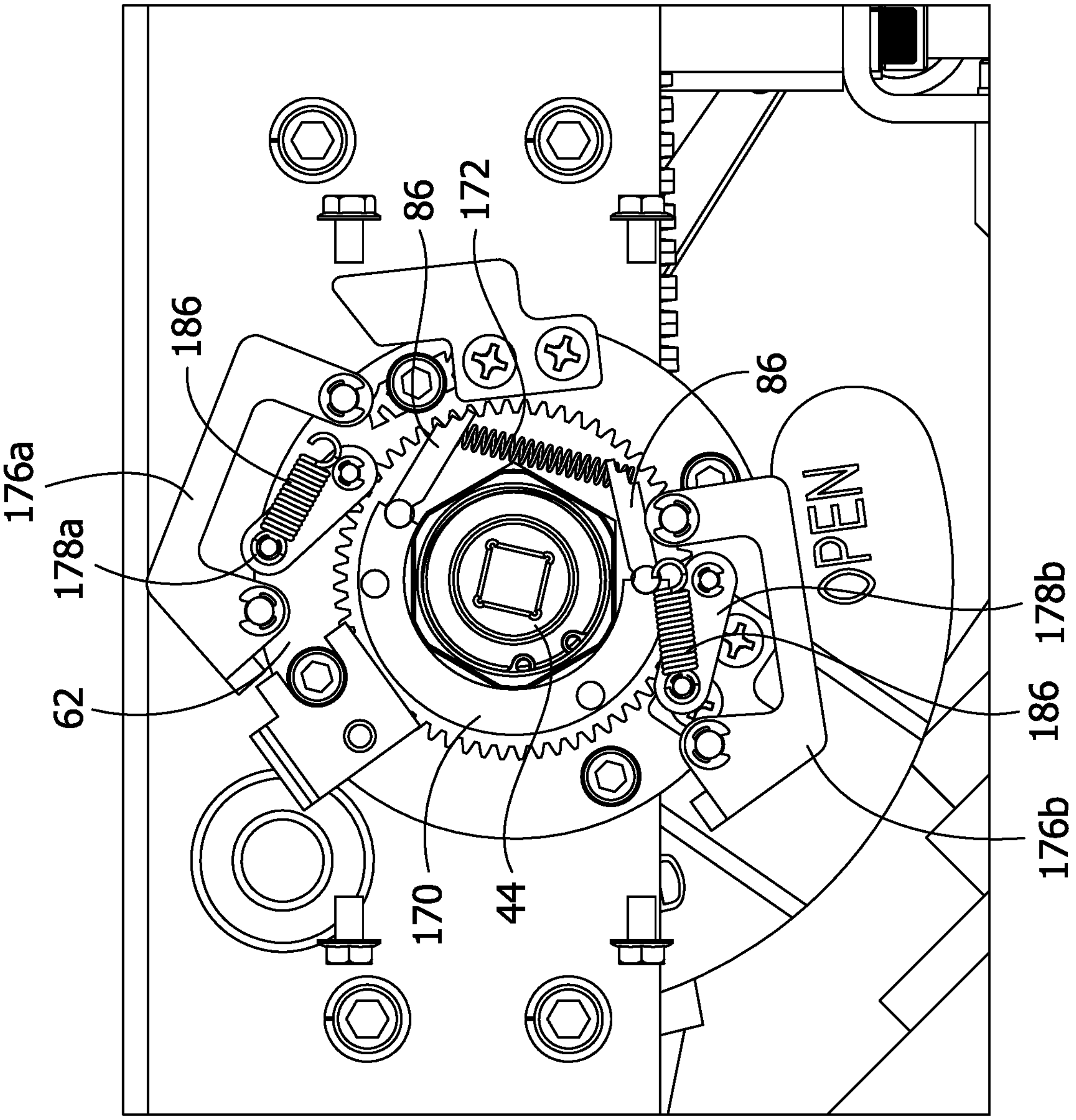
FIG. 19 is a fragmentary front plan view of FIG. 18 with the front cover removed.

In various embodiments, such as that illustrated in FIGS. 18 and 19, the selector assembly 82 does not comprise a selector plate 90. Preferably, when no selector plate 90 is included, the selector assembly 82 comprises two pawls 86 (e.g., a top right and a bottom right pawl). A stationary hinge plate 170 is positioned on the opposite side of the sleeve 80. In particular, one end of the top right pawl 86 is hingedly connected to the top end of the stationary hinge plate 170 and one end of the bottom right pawl 86 is hingedly connected to the bottom end of the stationary hinge plate 170. The other ends of the pawls 86 are connected to one another via a biasing member 172 (e.g., a spring). A first actuator plate 176*a* and a first link plate 178*a* are positioned near the top of the selector assembly 82 and a second actuator plate 176*b* and a second link plate 178*a* are positioned near the bottom of the selector assembly 82. In this embodiment, each of the first and second link plates 176*a*, 176*b* include an outwardly extending pin 84 thereon that extend through respective slots 108 in the front cover 58 sized and shaped to receive the shaft of the pin 84. A split washer 110 is placed between the end of the pin 84 and the front cover 58 to keep the pin from withdrawing. The first and second link plates 178*a*, 178*b* also contain an outwardly extending pin 180 therein that extend through respective slots 182 in the front cover 58 sized and shaped the receive the shaft of the pin 180. A split washer 184 is placed between the end of the pin 180 and the front cover 58 to keep the pin 180 from withdrawing. The pins 84, 180 of the first actuator plate 176*a* and first link plate 178*a*, and the second actuator plate 176*b* and the second link plate 178*b*, are connected via a biasing member 186.

When the assembly is actuated, the pins 84 move up in their respective slots 108, causing the link plate pin 180 to move up in its respective slot 182. This movement causes the end of the second actuator plate 176*a* to push upward on the bottom pawl 86 thereby disengaging the bottom pawl 86. In order to restore the biasing member 172 to a neutral position, the top pawl 86 moves upward and engages the ratchet ring 62. After 90 degrees of actuation, the pins 84, 180 move downward in their respective slots 108, 182, thereby causing the bottom pawl 86 to engage the ratchet ring 62 and the top pawl 86 to become disengaged. Thus, the actuation of the actuator 18 alone is configured to automatically change the direction of rotation of the input shaft 42 without having to separately engage a selector plate. Rather, the user needs only to flip the handle lever 20 to configure the actuator assembly 16 for charging the closing spring 46 and close the switch.

Figure 20:
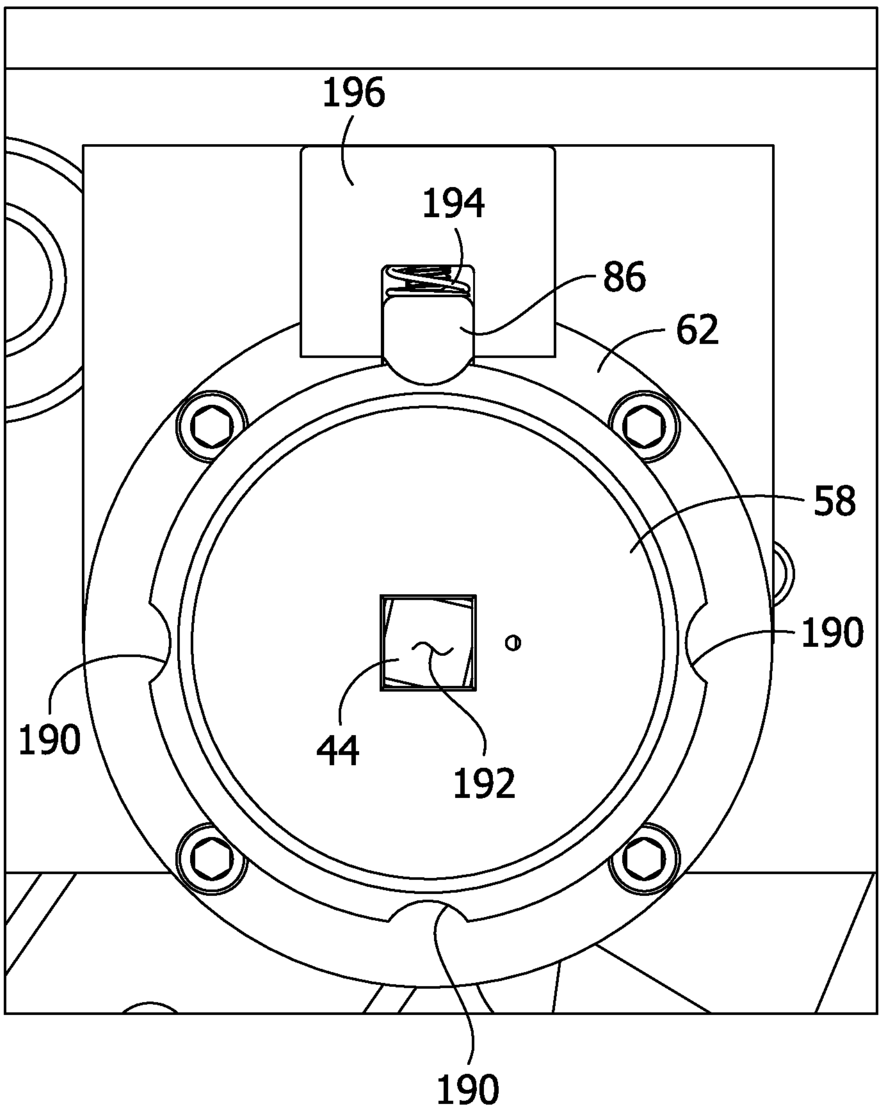
FIG. 20 is a fragmentary front plan view of another embodiment of a selector assembly without a selector plate and mechanical advantage device with the front cover in place.

In another embodiment, such as that illustrated in FIG. 20, the front cover 58 comprises a circular plate with four semi-circular detents 190 spaced circumferentially around the perimeter of the plate. The front cover 58 also defines a rectangular opening 192 in a central portion thereof to allow access to the mechanical advantage device 44. A pawl 86 is positioned at the top of the cover 58 and is sized and shaped to be received within the detents 190. An end of the pawl 86 is coupled to a biasing member 194 (e.g., a spring), which is in turn coupled to a stationary base plate 196. It is envisioned that additional pawls 86 can be included as necessary or desired. Upon actuation of the assembly, the pawl 86 is pushed upwards out of the detent 190 until it is able to snap into the next detent 190. Thus, instead of the ratchet assembly of the previous embodiments, the detents 190 preserve the mechanical work (i.e., rotation) of the actuator assembly in a given direction.

Figure 14:
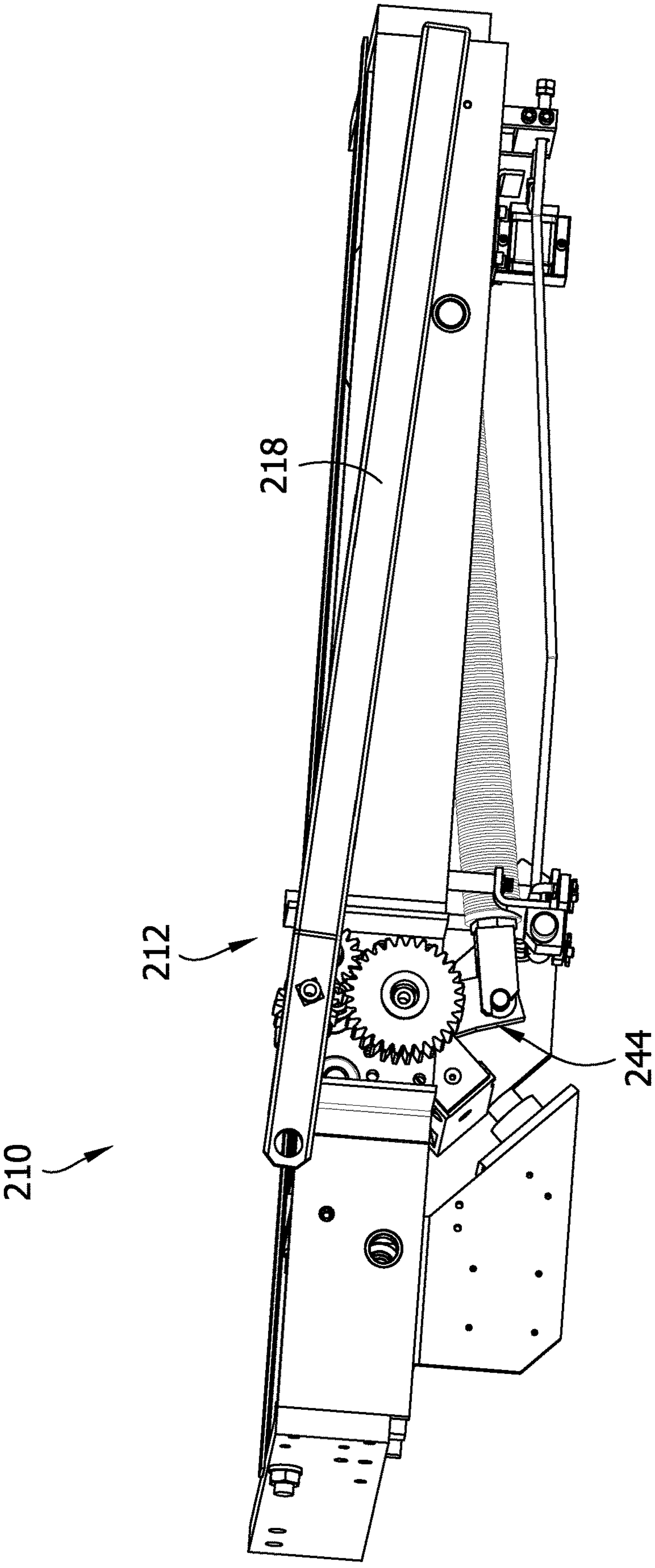
FIG. 14 is a fragmentary perspective view of another high current switch device showing a mechanical advantage device and actuator assembly.
Figure 15:
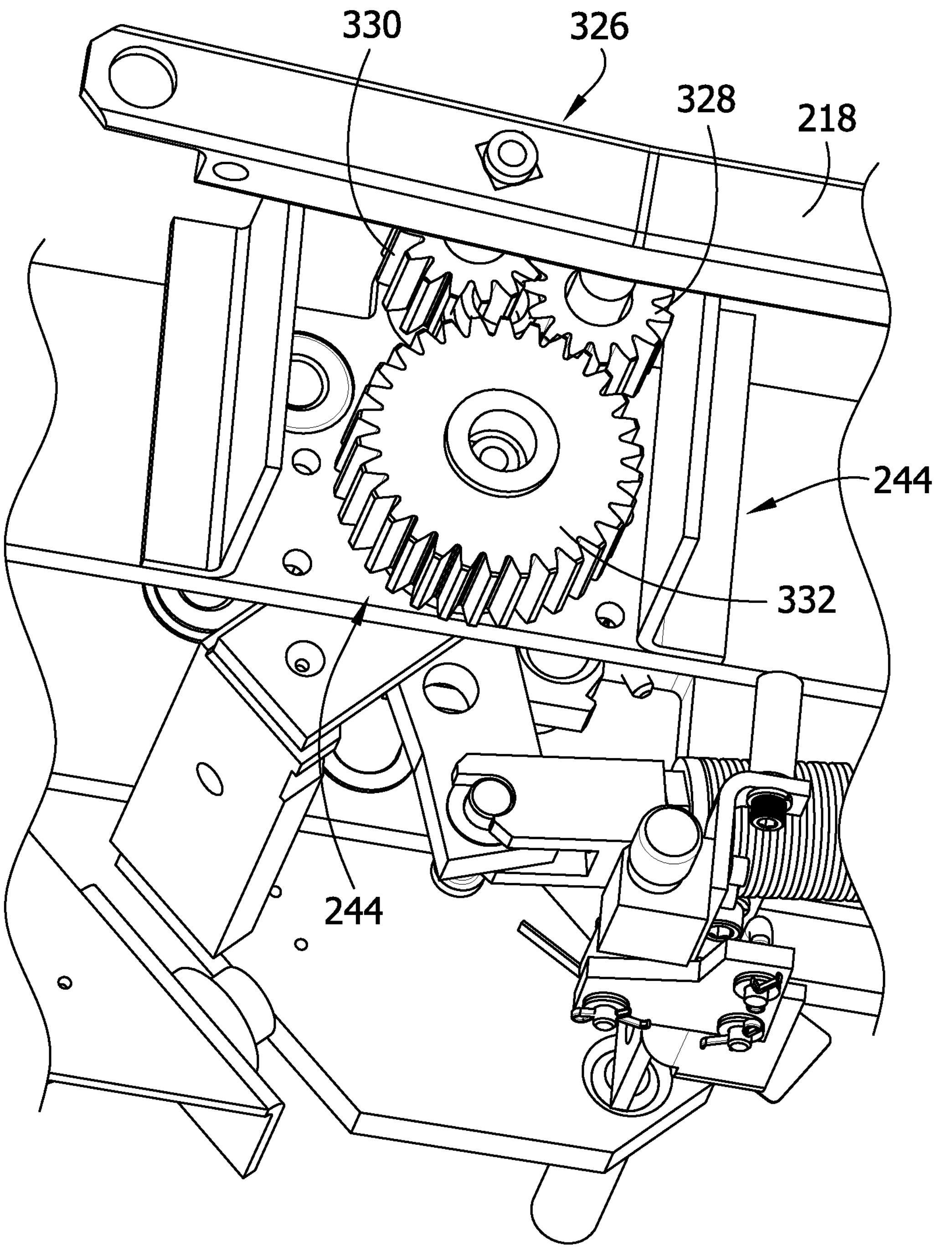
FIG. 15 is a fragmentary perspective view of the mechanical advantage device of FIG. 14.

FIGS. 14 and 15 illustrate another exemplary embodiment of an apparatus 210 comprising an electrical switching device 212 according to the present disclosure. The apparatus 210 is similar to device 10 described above, and corresponding parts are indicated by corresponding reference numerals plus 200. In this embodiment, the mechanical advantage device 244 comprises a spur gear train 326. The spur gear train 326 generally comprises an idler gear 328, an input pinion gear 330, and an output gear 332. In particular, the idler gear 328 ensures that the shaft rotation direction remains the same as the handle rotation direction. Actuation of the handle 218 causes rotation of the gears, thereby providing a mechanical advantage and reducing the required input force to rotate the input shaft.

Figure 16:
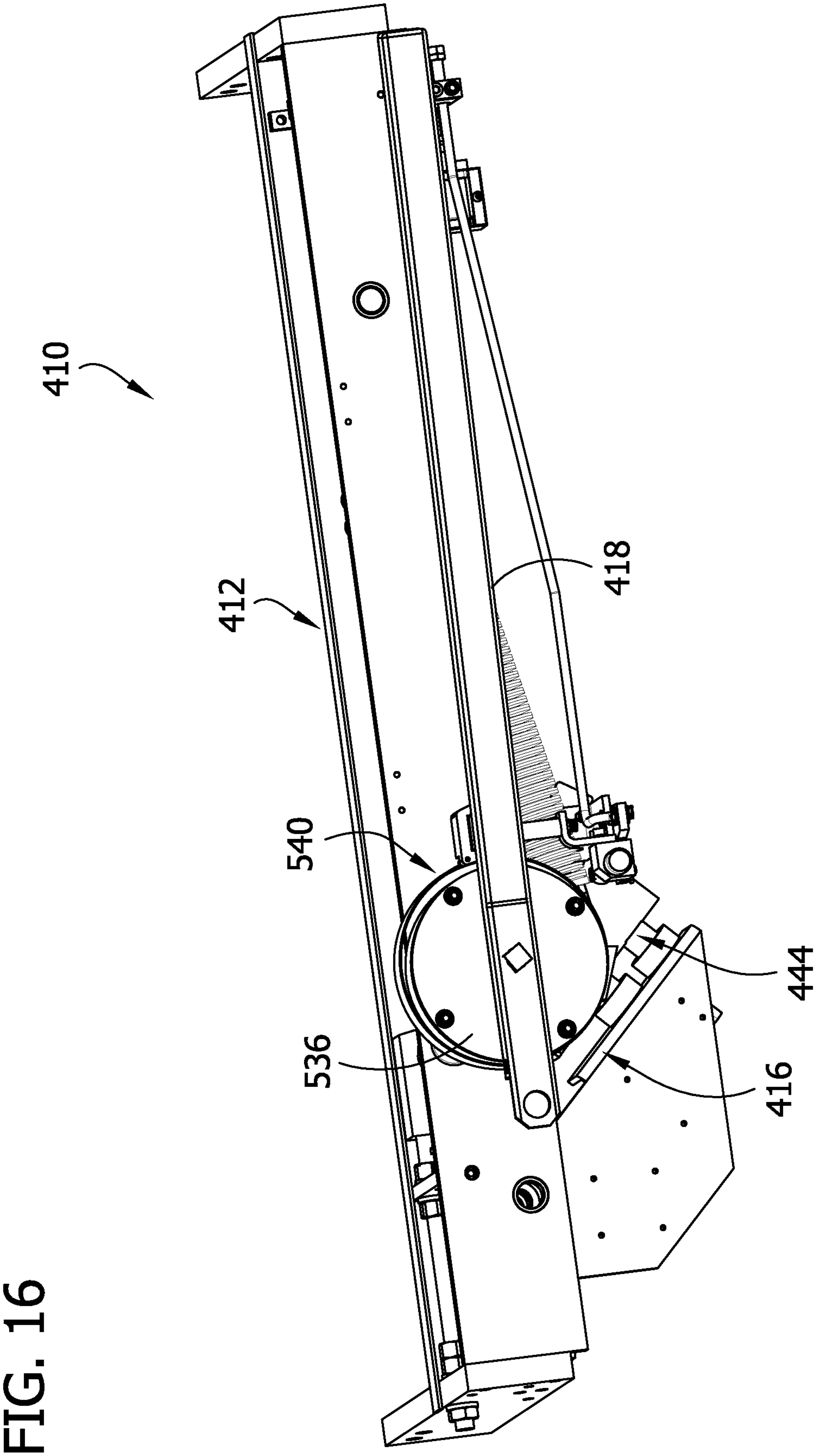
FIG. 16 is a fragmentary perspective view of another high current switch device showing a mechanical advantage device and actuator assembly.
Figure 17:
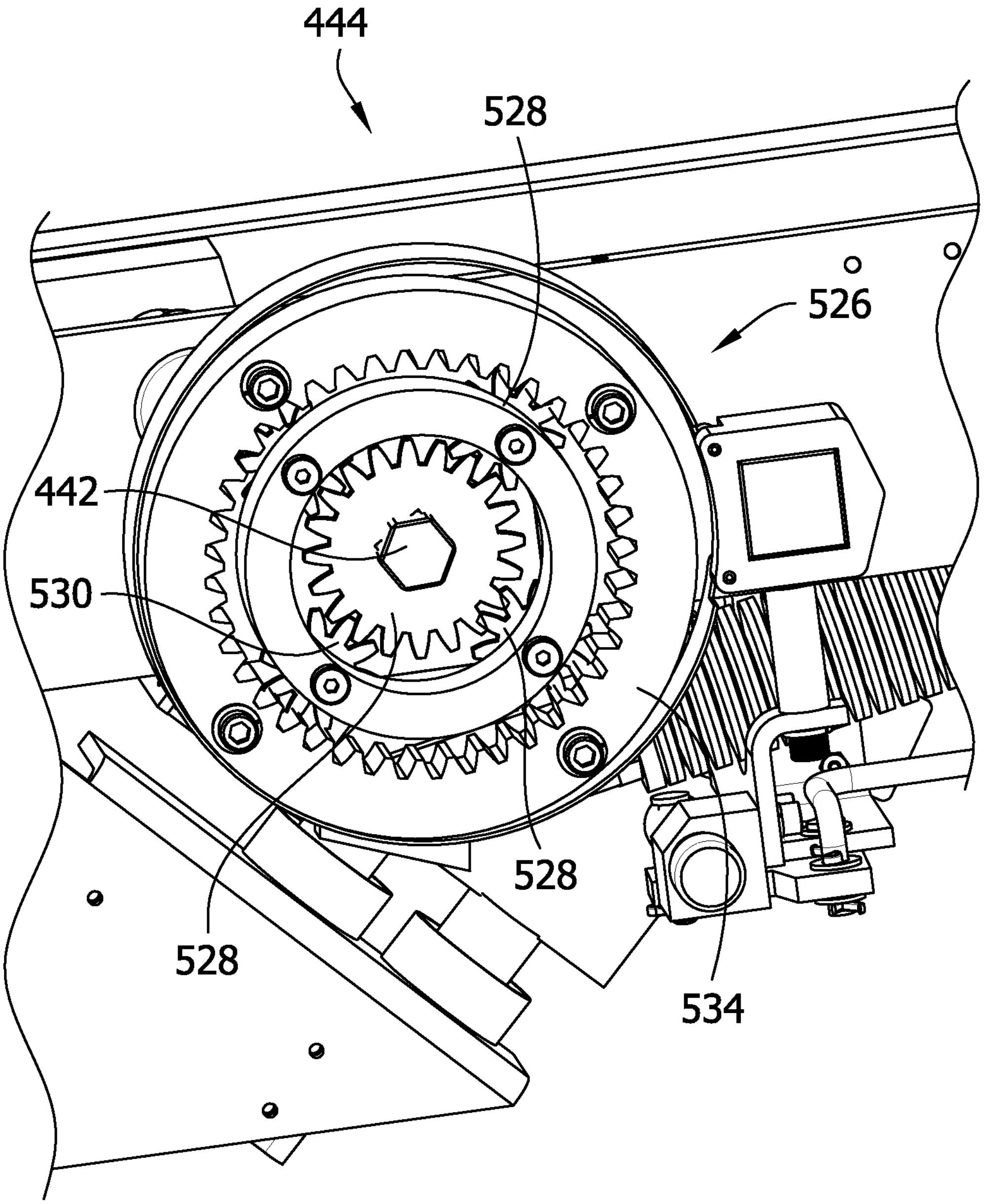
FIG. 17 is a fragmentary perspective view of the high current switch device of FIG. 16 with the front ring gear plate removed.

FIGS. 16 and 17 illustrate another exemplary embodiment of an apparatus 410 comprising an electrical switching device 412 according to the present disclosure. The device 410 is similar to device 10 described above, and corresponding parts are indicated by corresponding reference numerals plus 400. In this embodiment, the mechanical advantage device 444 comprises a planetary gear mechanism 526. A sun gear 528 is mounted onto the input shaft 442 of the switching device 412 and is coupled to the front panel 246 so that the planet gears 530 cannot revolve around the sun gear 528 and are limited to rotation about their own axes. An outer ring gear 534 is coupled to the mechanism 526 such that is meshes with the planet gears 530 and is fixed on the front ring gear plate 536. The handle 418 is coupled to a square protrusion (not shown) on the ring gear plate. A friction brake band 540 is assembled over the ring gear 534. When the brake 540 is actuated, the ring gear 534 is prohibited to rotate by inducing friction between the brake 540 and the outer cylindrical surface of the ring gear 534. In this way, when the handle 418 is actuated, the ring gear 534 rotates. The force applied is then multiplied as it transfers from the ring gear 534, to the planet gears 530, to the sun gear 528. The overall torque multiplication is determined by the gear ratio of the planetary gear arrangement. Thus, the mechanical advantage device 444 reduced the amount of force required to rotate the input shaft 442.

Having described the invention in detail, it will be apparent that modifications and variations are possible without departing from the scope of the invention defined in the appended claims.

When introducing elements of the present invention or the preferred embodiment(s) thereof, the articles “a”, “an”, “the” and “said” are intended to mean that there are one or more of the elements. The terms “comprising”, “including” and “having” are intended to be inclusive and mean that there may be additional elements other than the listed elements.

In view of the above, it will be seen that the several objects of the invention are achieved and other advantageous results attained.

As various changes could be made in the products without departing from the scope of the invention, it is intended that all matter contained in the above description and shown in the accompanying drawings shall be interpreted as illustrative and not in a limiting sense

The invention claimed is:

1. A high current switching device comprising:
an electrical switch assembly;
an input shaft operatively connected to the electrical switch assembly; and
an actuator assembly attached to the input shaft and configured to move the input shaft to operate the electrical switch assembly, the actuator assembly comprising:
a mechanical advantage device operatively attached to the input shaft; and
an actuator coupled to the mechanical advantage device such that movement of
the actuator causes movement of the input shaft to operate the electrical switch assembly; wherein the mechanical advantage device is configured to decrease an amount of force required to move the input shaft by the actuator,
wherein a force reduction ratio provided by the mechanical advantage device is at least about 3:1.

2. The device of claim 1 wherein the mechanical advantage device comprises a torque multiplier.

3. The device of claim 1 wherein the actuator assembly comprises a ratchet assembly operatively coupled to the input shaft, wherein the ratchet assembly is configured to allow motion of the actuator in a first direction to move the input shaft in the first direction while preventing motion of the input shaft in a second direction opposite the first direction when the actuator is moved in the second direction.

4. A high current switching device comprising:

an electrical switch assembly;

an input shaft operatively connected to the electrical switch assembly; and an actuator assembly attached to the input shaft and configured to move the input shaft to operate the electrical switch assembly, the actuator assembly comprising:

a ratchet assembly operatively attached to the input shaft; and an actuator coupled to the ratchet assembly such that movement of the actuator causes movement of the input shaft to operate the electrical switch assembly;

wherein the ratchet assembly is configured to allow motion of the actuator in a first direction to move the input shaft in the first direction while preventing motion of the input shaft in a second direction opposite the first direction when the actuator is moved in the second direction, wherein the ratchet assembly comprises a ratchet ring including an internal gear and at least one pawl configured to engage the internal gear to configure the ratchet assembly to transfer motion of actuator to the input shaft in the first direction and not the second direction.

5. The device of claim 4 wherein the ratchet assembly reduces a degree of rotation of the actuator needed for rotating the input shaft to operate the electrical switch assembly.

6. The device of claim 4 wherein the ratchet assembly configures the actuator for rotation of less than 180 degrees in the first direction to operate the electrical switch assembly.

7. The device of claim 4 further comprising a selector assembly configured to switch the direction in which the ratchet assembly imparts movement to the input shaft.

8. The device of claim 7 wherein the selector assembly comprises a selector plate and at least one selector attached to the selector plate, movement of the selector plate causing the selector to engage the ratchet assembly for selecting the direction in which the ratchet assembly imparts movement to the input shaft.

9. The device of claim 7 wherein the selector assembly comprises selectors automatically engaged in the ratchet assembly to select the direction in which the ratchet assembly imparts movement to the input shaft.

10. The device of claim 4 wherein the at least one pawl comprises a pair of pawls, and wherein the ratchet assembly further comprises a selector comprising a pin configured to engage one of the pawls to disengage the pawl from the ratchet ring such that the other of the pawls is allowed to engage the ratchet ring.

11. The device of claim 4 further comprising a mechanical advantage device operatively attached to the input shaft, wherein the mechanical advantage device is configured to decrease an amount of force required to move the input shaft by the actuator.

12. The device of claim 4 further comprising a selector lever on the actuator.

13. A mechanical advantage assembly configured to couple an actuator to a switching device, the mechanical advantage device assembly comprising:

a mechanical advantage device configured to be operatively coupled to the input shaft; and a hub configured to secure the mechanical advantage device to the input shaft, wherein the mechanical advantage device is configured to decrease an amount of force required to move the input shaft by the actuator, wherein a force reduction ratio provided by the mechanical advantage device is at least about 3:1.

14. The assembly of claim 13 wherein the mechanical advantage device comprises a torque multiplier.

15. The assembly of claim 13 further comprising a ratchet assembly operatively coupled to the input shaft, wherein the ratchet assembly is configured to allow motion of the actuator in a first direction to move the input shaft in the first direction while preventing motion of the input shaft in a second direction opposite the first direction when the actuator is moved in the second direction.

16. The assembly of claim 15 wherein the ratchet assembly comprises a ratchet ring and a pair of pawls, the actuator assembly further comprising a selector configured to operatively engage one of the pawls to disengage the pawl from the ratchet ring such that the other of the pawls is allowed to engage the ratchet ring.

17. The assembly of claim 15 further comprising a selector assembly configured to switch the direction in which the ratchet assembly imparts movement to the input shaft, wherein the selector assembly comprises a selector plate and at least one selector attached to the selector plate, movement of the selector plate causing the selector to operatively engage the ratchet assembly for selecting the direction in which the ratchet assembly imparts movement to the input shaft.

* * * * *